United States Patent
Moteki et al.

(10) Patent No.: US 7,158,714 B2
(45) Date of Patent: Jan. 2, 2007

(54) IMAGE RECORDING/REPRODUCING APPARATUS AND METHOD

(75) Inventors: Masataka Moteki, Yokohama (JP); Kazuya Fujita, Kawasaki (JP); Hideo Kataoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1141 days.

(21) Appl. No.: 10/153,861

(22) Filed: May 24, 2002

(65) Prior Publication Data

US 2002/0159751 A1    Oct. 31, 2002

Related U.S. Application Data

(63) Continuation of application No. PCT/JP01/08546, filed on Sep. 28, 2001.

(30) Foreign Application Priority Data

Sep. 29, 2000    (JP)    ............................. 2000-301388

(51) Int. Cl.
*H04N 7/26*    (2006.01)
(52) U.S. Cl. ...................................................... 386/112
(58) Field of Classification Search ................ 386/46, 386/109, 112, 124
See application file for complete search history.

(56) References Cited

FOREIGN PATENT DOCUMENTS

JP    11-355707    12/1999
JP    2000-30365    1/2000

*Primary Examiner*—Thai Tran
*Assistant Examiner*—Mishawn Dunn
(74) *Attorney, Agent, or Firm*—Pillsbury Winthrop Shaw Pittman, LLP

(57) ABSTRACT

In an image recording/reproducing apparatus capable of handling a hard disk and an optical disk, when just-recording on the hard disk has been requested, if a residual recording capacity of the hard disk is more than a residual recording capacity of the optical disk that is in a non-recorded state, a compression encoding rate for image information is set by regarding the residual recording capacity of the hard disk as being equal to the residual recording capacity of the optical disk in the non-recorded state.

8 Claims, 9 Drawing Sheets

Record programming menu screen

| CH | Date | Start | End | Record destination | mode | Rate | Sound quality | TS |
|---|---|---|---|---|---|---|---|---|
| BS15 | 4/12 | PM07:30 | PM08:00 | DVD | Manual | 6.0 | DB-S | Off |
| 12 | 4/14 | PM07:00 | PM10:00 | HDD | SP | 5.0 | DB-S | On |
| 8 | 4/18 | AM08:00 | AM09:00 | DVD | SP | 5.0 | DB-S | On |
| 6 | 4/25 | PM08:30 | PM10:00 | DVD | LP | 5.0 | DB-S | On |
| 3 | 4/29 | PM01:00 | PM04:20 | HDD | SP | 2.4 | DB-S | On |
| 4 | 4/30 | PM10:00 | PM12:00 | HDD | SP | 5.0 | L-PCM | Off |
| 10 | 5/1 | AM10:00 | PM01:00 | HDD | SP | 5.0 | DB-S | Off |

F I G. 3

IMAGE RECORDING/REPRODUCING APPARATUS AND METHOD

CROSS-REFERENCE TO RELATED APPLICATIONS

This is a Continuation Application of PCT Application No. PCT/JP01/08546, filed Sep. 28, 2001, which was not published under PCT Article 21(2) in English.

This application is based upon and claims the benefit of priority from the prior Japanese Patent Application No. 2000-301388, filed Sep. 29, 2000, the entire contents of which are incorporated herein by reference.

BACKGROUND OF THE INVENTION

1. Field of the Invention

The present invention relates to improvements in an image recording/reproducing apparatus and method capable of simultaneously handling a recording medium loadable in the apparatus, such as an optical disk, and a recording medium built in the apparatus, such as a hard disk.

2. Description of the Related Art

As is well known, an image recording/reproducing apparatus has recently been developed, which is capable of simultaneously handling a recording medium loadable in the apparatus, such as optical disks including a DVD (Digital Versatile Disk)-RAM (Random Access Memory) and a DVD-RW (ReWritable), and a large-capacity recording medium with a high recording/reproducing speed, such as a hard disk, which is built in the apparatus.

In this type of image recording/reproducing apparatus, the advantages of optical disks and the advantages of hard disks are organically combined. Thus, it is potentially capable of offering to users various new functions, which could not be realized by conventional image recording/reproducing apparatuses. Under the circumstances, at present, there is a strong demand for improvements in the details of this type of image recording/reproducing apparatus, thereby to make the apparatus more useful without problems.

For example, there is known a so-called just-recording function as a function of recording image information in a recording medium. In the just-recording function, the amount of image information to be recorded is controlled using compression encoding techniques in accordance with an empty recording capacity of the recording medium. Thereby, all the recording capacity of the recording medium is used up, without leaving any useless empty recording capacity.

When the just-recording function is adopted in the above-described image recording/reproducing apparatus capable of simultaneously handling the optical disk and hard disk, there is no particular problem with the optical disk. However, as regards the hard disk, there is a case where the empty recording capacity is 100 G (Giga) bytes or more. If image information was encoded in accordance with such an enormous empty recording capacity, the stream data size would disadvantageously be increased uselessly and practical processing could not be carried out.

The present invention has been made in consideration of the above circumstances, and its object is to provide an image recording/reproducing apparatus and method capable of simultaneously handling a recording medium loadable in the apparatus and a recording medium built in the apparatus, wherein disadvantages of a large-capacity recording medium at the time of adopting a just-recording function are eliminated, and the operability for users is improved.

BRIEF SUMMARY OF THE INVENTION

The present invention provides an image recording/reproducing apparatus capable of effecting recording/reproducing of compression-encoded image information, respectively, for a first recording medium detachably attached to the apparatus and a second recording medium built in the apparatus and having a larger capacity than the first recording medium.

In a state in which recording needs to be effected on the second recording medium, with a compression encoding rate for the image information being controlled to use an entirety of a residual recording capacity of the second recording medium, it is determined whether the residual recording capacity of the second recording medium is equal to or smaller than a residual recording capacity of the first recording medium that is in a non-recorded state, and if the residual recording capacity of the second recording medium is equal to or smaller than the residual recording capacity of the first recording medium in the non-recorded state, the compression encoding rate for the image information is set to use the entirety of the residual recording capacity of the second recording medium, and if the residual recording capacity of the second recording medium is larger than the residual recording capacity of the first recording medium in the non-recorded state, the compression encoding rate for the image information is set by regarding the residual recording capacity of the second recording medium as equal to the residual recording capacity of the first recording medium in the non-recorded state.

This invention also provides an image recording/reproducing method capable of effecting recording/reproducing of compression-encoded image information for a first recording medium detachably attached to an apparatus and a second recording medium built in the apparatus and having a larger capacity than the first recording medium.

In a state in which recording needs to be effected on the second recording medium, with a compression encoding rate for the image information being controlled to use an entirety of a residual recording capacity of the second recording medium, it is determined whether the residual recording capacity of the second recording medium is equal to or smaller than a residual recording capacity of the first recording medium that is in a non-recorded state, and if the residual recording capacity of the second recording medium is equal to or smaller than the residual recording capacity of the first recording medium in the non-recorded state, the compression encoding rate for the image information is set to use the entirety of the residual recording capacity of the second recording medium, and if the residual recording capacity of the second recording medium is larger than the residual recording capacity of the first recording medium in the non-recorded state, the compression encoding rate for the image information is set by regarding the residual recording capacity of the second recording medium as being equal to the residual recording capacity of the first recording medium in the non-recorded state.

According to the above structure and method, in the state in which recording needs to be effected on the second recording medium, with a compression encoding rate for the image information being controlled to use an entirety of a residual recording capacity of the second recording medium, if the residual recording capacity of the second recording medium is more than the residual recording capacity of the first recording medium in the non-recorded state, the compression encoding rate for the image information is set by regarding the residual recording capacity of the second recording medium as being equal to the residual recording capacity of the first recording medium in the non-recorded state.

In the prior art, such a non-practical process has been performed that image data is encoded to correspond to an enormous residual recording capacity of a hard disk, which merely increases the stream data size. According to this invention, this non-practical process is not performed, and the operability for users is further enhanced. In addition, for example, the data recorded on a hard disk can advantageously be transferred to an optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows an example of a record programming menu screen in the first embodiment;

DETAILED DESCRIPTION OF THE INVENTION

Figure 1:
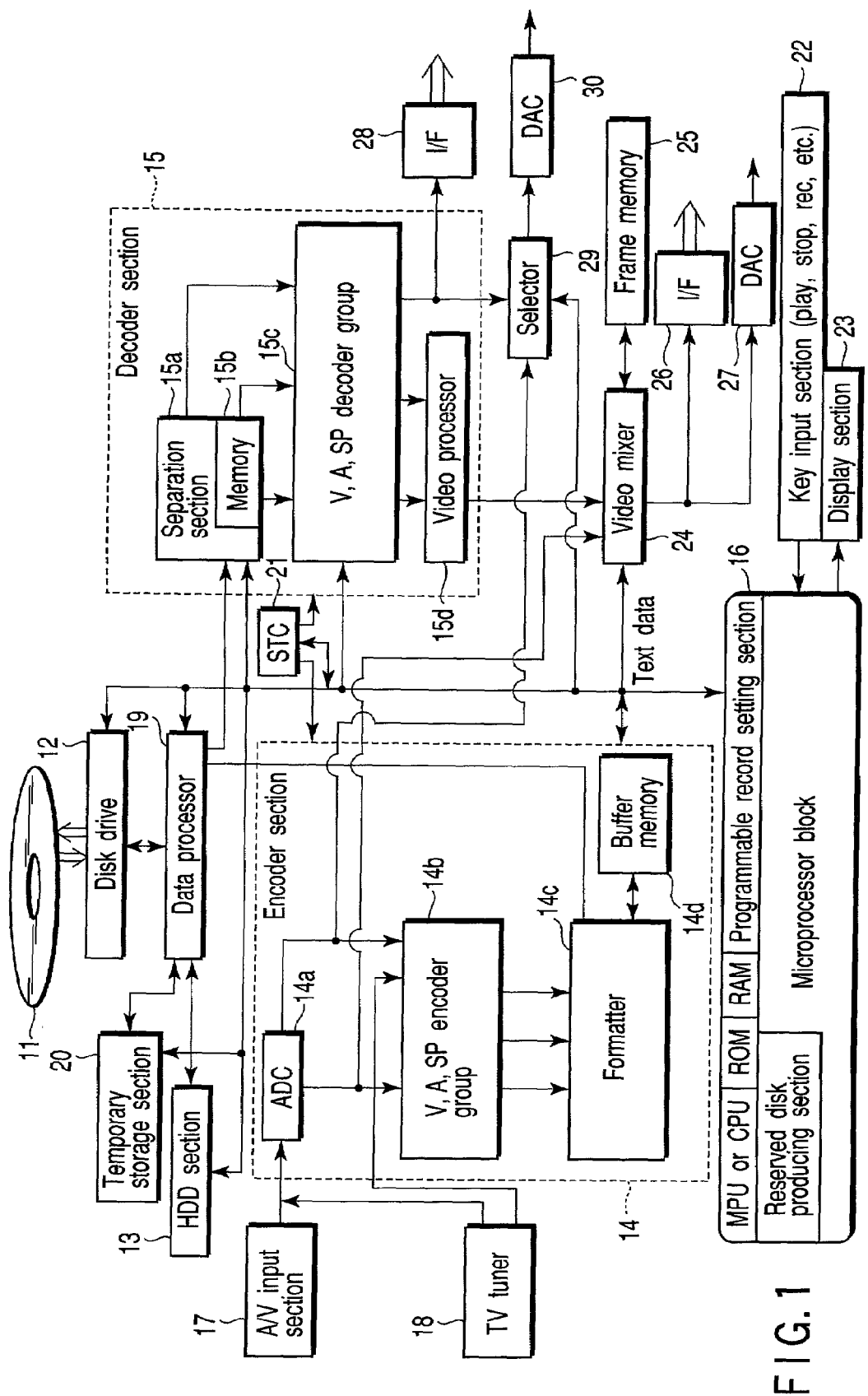
FIG. 1 is a block diagram showing the structure of an image recording/reproducing apparatus according to a first embodiment of the present invention.

A first embodiment of the present invention will now be described in detail with reference to the accompanying drawings. FIG. 1 schematically shows the structure of an image recording/reproducing apparatus according to the first embodiment.

The image recording/reproducing apparatus mainly comprises a disk drive 12, a HDD (Hard Disk Drive) section 13, an encoder section 14 constituting a recording side, a decoder section 15 constituting a reproducing side, and a microcomputer block 16 for controlling total operations of the apparatus body. The disk drive 12 can drive an optical disk such as a DVD-RAM or a DVD-RW, and write and read information on and from the optical disk 11. The HDD section 13 can drive a hard disk and write and read information on and from the hard disk.

The encoder section 14 comprises an ADC (Analog-to-Digital Converter) 14a; an encoder group 14b including a V (Video) encoder, an A (Audio) encoder and an SP (Sub-Picture) encoder; a formatter 14c for converting an output of each encoder of the encoder group 14b to a predetermined format; and a buffer memory 14d to be used for operations of the formatter 14c.

The ADC 14a receives an external analog video signal plus an external analog audio signal from an A/V (Audio/Video) input section 17, or an analog video signal plus an analog audio signal from a TV (Television) tuner 18.

The ADC 14a digitizes the input analog video signal with, e.g. a sampling frequency of 13.5 MHz and a quantization bit number of 8 bits. Specifically, a luminance component Y, a color difference component Cr (or Y-R) and a color difference component Cb (or Y-B) are quantized with 8 bits, respectively.

Similarly, the ADC 14a digitizes the input analog audio signal with, e.g. a sampling frequency of 48 kHz and a quantization bit number of 16 bits.

When a digital video signal or a digital audio signal is input to the ADC 14a, the ADC 14a passes the digital video signal or digital audio signal through.

It is permitted to subject the digital video signal and digital audio signal to jitter reduction processing, sampling-rate alteration processing, etc. without changing the content thereof.

The digital video signal output from the ADC 14a is delivered to the formatter 14c via the V encoder of the encoder group 14b. The digital audio signal output from the ADC 14c is delivered to the formatter 14c via the A encoder of the encoder group 14b.

The V encoder has a function of converting the input digital video signal to a digital video signal compressed with a variable bit rate, on the basis of the MPEG (Moving Picture Image Coding Experts Group)-2 or MPEG-1 standard.

The A encoder has a function of converting the input digital audio signal to a digital audio signal compressed at a fixed bit rate or a linear PCM (Pulse Code Modulation) digital audio signal, on the basis of the MPEG or AC (Audio Compression)-3 standard.

When a sub-picture (SP) signal has been input from the A/V input section 17 (e.g. a signal from a DVD video player with an independent output terminal for sub-picture signals) or when a DVD video signal of such a data scheme has been broadcast and received by the TV tuner 18, the sub-picture signal in the DVD video signal is input to the SP encoder of the encoder group 14b. The sub-picture signal input to the SP encoder is arranged in a predetermined signal form and delivered to the formatter 14c.

The formatter 14c, while using the buffer memory 14d as a work area, subjects the input digital video signal, digital audio signal and sub-picture signal to predetermined signal processing in a format suitable for recording, and delivers the resultant signals to a data processor 19.

The information encoded by the encoder section 14 and produced management information can be recorded on the optical disk 11 via the data processor 19 and disk drive 12.

In this image recording/reproducing apparatus, the information encoded by the encoder section 14 and produced management information can be supplied to the HDD section 13 via the data processor 19 and recorded on the hard disk.

Information recorded on the hard disk can be read out by the HDD section 13 and recorded on the optical disk 11 via the data processor 19 and disk drive 12.

In this case, if the format of information recorded on the hard disk is the same as the data format of the optical disk 11, the information read from the hard disk is directly recorded on the optical disk 11.

If the format of information recorded on the hard disk is different from the data format of the optical disk 11, the information read from the hard disk is supplied to the encoder section 14 and encoded to match with the data format of optical disk 11, and the resultant data is transferred and recorded on the optical disk 11.

The image recording/reproducing apparatus has a section for writing and reading (recording and reproducing) information on and from the optical disk 11. This section comprises the disk drive 12 with an optical system and a drive system, the data processor 19, a temporary storage section 20, and an STC (System Time Counter or System Time Clock) 21.

The temporary storage section 20 is used to buffer a predetermined amount of data, which is to be output from the encoder section 14 and written on the optical disk 11 via the data processor 19 and disk drive 12, or a predetermined amount of data, which is to be read from the optical disk 11 by the disk drive 12 and input to the decoder section 15 via the data processor 19.

Under the control of the microcomputer block 16, the data processor 19 supplies to-be-recorded data from the encoder section 14 to the disk drive 12, receives data read from the optical disk 11 by the disk drive 12, rewrites management information recorded on the optical disk 11, and deletes data recorded on the optical disk 11.

The microcomputer block 16 includes an MPU (Micro Processing Unit) [or a CPU (Central Processing Unit)], a ROM (Read Only Memory) storing control programs, and a RAM providing a work area necessary for executing programs.

The MPU of the microcomputer block 16 receives operational information from a key input section 22 and controls whole operations of the apparatus using the RAM as a work area on the basis of the control programs stored in the ROM.

Of the control operations executed by the microcomputer block 16, a record programming operation and a just-recording operation characterize the present invention. The just-recording operation includes a setting of a compression encoding rate of record data, and a detection of residual record capacity in the optical disk 11 or hard disk.

Of the execution results of the microcomputer block 16, a result to be told to the user is displayed on a display section 23 or displayed on a monitor display (not shown) by OSD (On Screen Display).

The timing, at which the microcomputer block 16 controls the disk drive 12, data processor 19, encoder section 14, decoder section 15, etc., is determined based on temporal data from the STC 21.

The decoder section 15 comprises a separation section 15a, a memory 15b, a decoder group 15c, and a video processor 15d. The separation section 15a separates main picture data, sub-picture data and audio data from the data read from the optical disk 11 by the disk drive 12 and input via the data processor 19. The memory 15b is used at the time of executing a separation process or other signal processes in the separation section 15a. The decoder group 15c comprises a V decoder for decoding main picture data separated by the separation section 15a, an SP decoder for decoding sub-picture data separated by the separation section 15a, and an A decoder for decoding audio data separated by the separation section 15a. The video processor 15d properly synthesizes the main picture data obtained from the V decoder and the sub-picture data obtained from the SP decoder, and superimposes a sub-picture on a main picture for display.

An output from the video processor 15d is delivered to a video mixer 24. The video mixer 24 synthesizes text data. The video mixer 24 is connected to a line for directly taking in signals from the A/V input section 17 and TV tuner 18. A frame memory 25 used as a buffer is connected to the video mixer 24.

When a digital output from the video mixer 24 is required, the output is fed to the outside via an I/F (Inter/Face) 26. When an analog output is required, the output is fed to the outside via a DAC (Digital to Analog Converter) 27.

When a digital output from the A decoder is required, the output is fed to the outside via an I/F 28. When an analog output is required, the output is analog-converted by a DAC 30 via a selector 29 and fed to the outside.

The selector 29 may receive a select signal from the microcomputer block 16 to select an output from the ADC 14a, when the output signal from the A/V input section 17 or TV tuner 18 is to be directly monitored.

Figure 2:
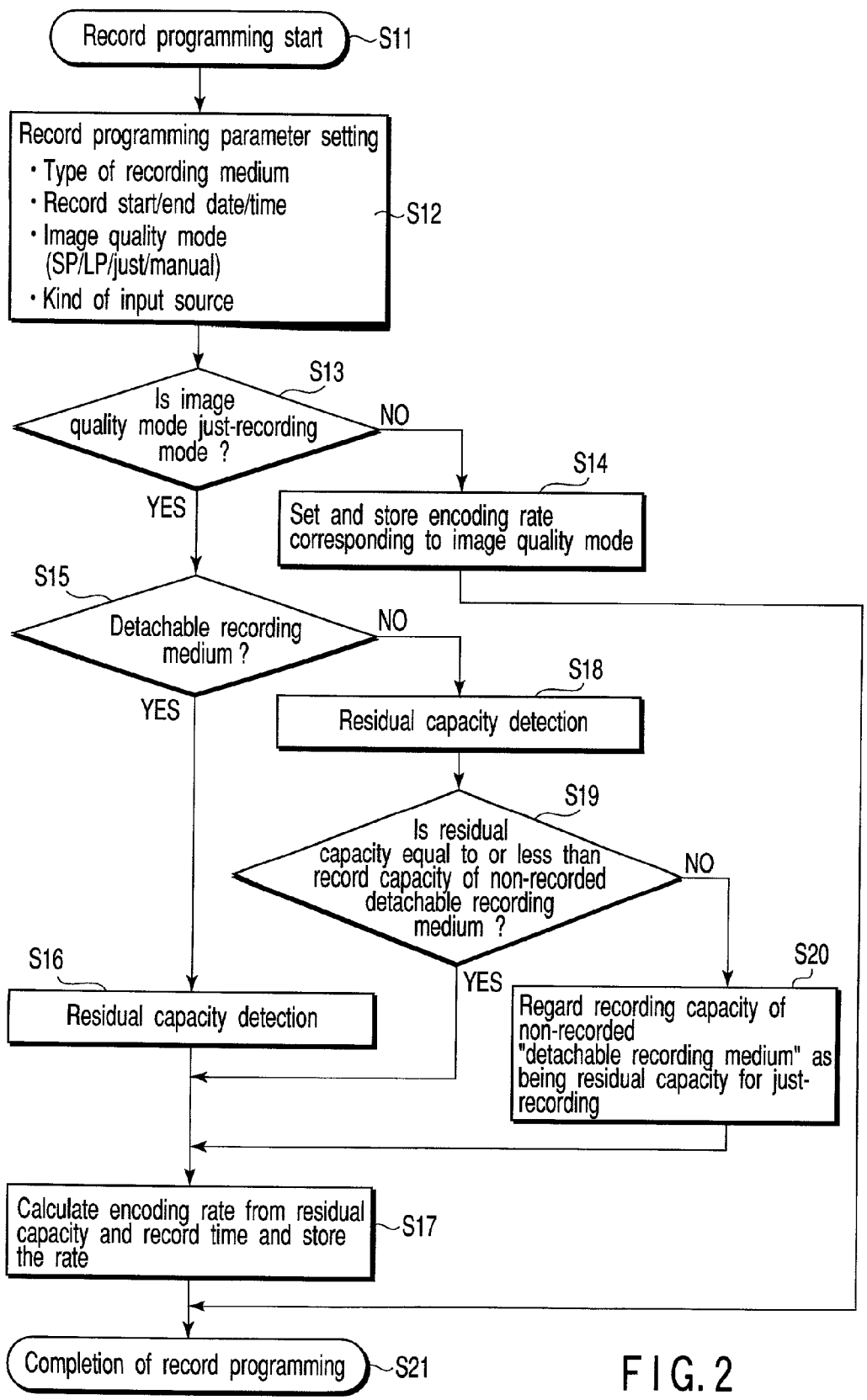
FIG. 2 is a flow chart illustrating a record programming operation in the first embodiment.

FIG. 2 is a flow chart illustrating a record programming operation in the above-described first embodiment. Specifically, when the user starts a record programming operation (step S11), he/she operates the key input section 22 in step S12, inputs record programming parameters and stores them in the RAM.

The record programming parameters include, for example, the type of recording medium indicating whether a recording medium is the optical disk 11 or hard disk, the date/time of recording start/end, the image quality modes, the kind of input source, etc.

The image quality modes include a standard mode (SP) in which compression encoding is effected with a standard encoding rate preset for to-be-recorded data; a long-time mode (LP) in which compression encoding is effected with a long-time encoding rate preset for to-be-recorded data; a just-recording mode in which compression encoding is effected with an encoding rate automatically set such that to-be-recorded data may be just stored in a residual recording capacity in the recording medium; and a manual mode in which the user sets an encoding rate as desired.

If the record programming parameters have been input, the microcomputer block 16, upon the user's request, can display, e.g. on the display section 23, a record programming menu screen as shown in FIG. 3, on the basis of the input record programming parameters.

The record programming menu screen shows, as programming information, a channel, a date, a start time, an end time, a record destination, an image quality mode, a compression encoding rate, a sound quality, and a time slip (TS).

Referring to the record programming menu screen of FIG. 3, for example, as regards the first programming information, it is indicated that a program to be program-recorded is broadcast at Channel 15 of satellite broadcast (BS15), the date of broadcast is April 12, and the time of the program is from 7:30 PM to 8:00 PM.

The record destination of the program is a DVD, the image quality mode is a manual mode, and the compression encoding rate is 6.0. Moreover, the sound quality is set by a Dolby system (DB-S), and the recording is effected in the time slip mode.

On the record programming menu screen, the input position (row) of programming information is set by vertically moving a black rectangular cursor K displayed on the left side of the screen.

Programming information recorded on the optical disk 11 for the purpose of producing a reserved disk is indicated by a white-circle label L shown on the right side of the screen. For example, when the same-series programs (a series of programs such as dramas, with different dates of broadcast) are to be exclusively recorded on one optical disk 11, the related programming information is recorded on the optical disk 11. Thereby, the optical disk 11 can be designated as a reserved disk.

If the record programming parameters have been input in step S12, the microcomputer block 16 of the image recording/reproducing apparatus determines in step S13 whether the image quality mode is the just-recording mode. If it is determined that the image quality mode is not the just-recording mode (NO), an encoding rate corresponding to the set image quality mode is specified and stored in the RAM in step S14. The record programming process is thus completed (step S21).

If it is determined in step S13 that the image quality mode is the just-recording mode (YES), the microcomputer block 16 determines in step S15 whether the recording medium is a detachable recording medium, that is, optical disk 11.

If it is determined in step S15 that the recording medium is the optical disk 11 (YES), the microcomputer block 16 detects a residual recording capacity of the optical disk 11 in step S16. In step S17, the microcomputer block 16 calculates an encoding rate from the residual recording capacity and record time, and stores it in the RAM. The record programming process is thus completed (step S21).

On the other hand, if it is determined in step S15 that the recording medium is not the optical disk 11 (NO), the microcomputer block 16 determines in step S18 that the recording medium for just-recording is the hard disk and detects the residual recording capacity of the hard disk.

Thereafter, the microcomputer block 16 determines in step S19 whether the residual recording capacity of the hard disk is equal to or less than the recording capacity of the optical disk 11 in the non-recorded state.

If it is determined that the residual recording capacity of the hard disk is more than the recording capacity of the non-recorded optical disk 11 (NO), the microcomputer block 16 executes in step S20 a process to regard that portion of the recording capacity of the hard disk, which is equal to the recording capacity of the non-recorded optical disk 11, as being the residual recording capacity for the just-recording. Then, the microcomputer block 16 proceeds to step S17.

In step S19, if it is determined that the residual recording capacity of the hard disk is equal to or less than the recording capacity of the non-recorded optical disk 11 (YES), the microcomputer block 16 calculates in step S17 an encoding rate from the residual recording capacity of the hard disk and record time, and stores it in the RAM. The record programming process is thus completed (step S21).

According to the record programming operation illustrated in FIG. 2, even where the hard disk is selected as the recording medium and the just-recording is set, the just-recording operation is carried out if the residual recording capacity of the hard disk is equal to or less than the recording capacity of the non-recorded optical disk 11. Thus, the just-recording can be effected on the hard disk without the problem in the prior art.

The operation illustrated in FIG. 2 may be executed as a record preparation operation immediately before (e.g. several seconds before) the actual start of programmed recording. This may be performed in consideration of the case where there is a long time interval (e.g. several months) between the point in time when the user inputs record programming parameters and the point in time when programmed recording is actually started.

Figure 4:
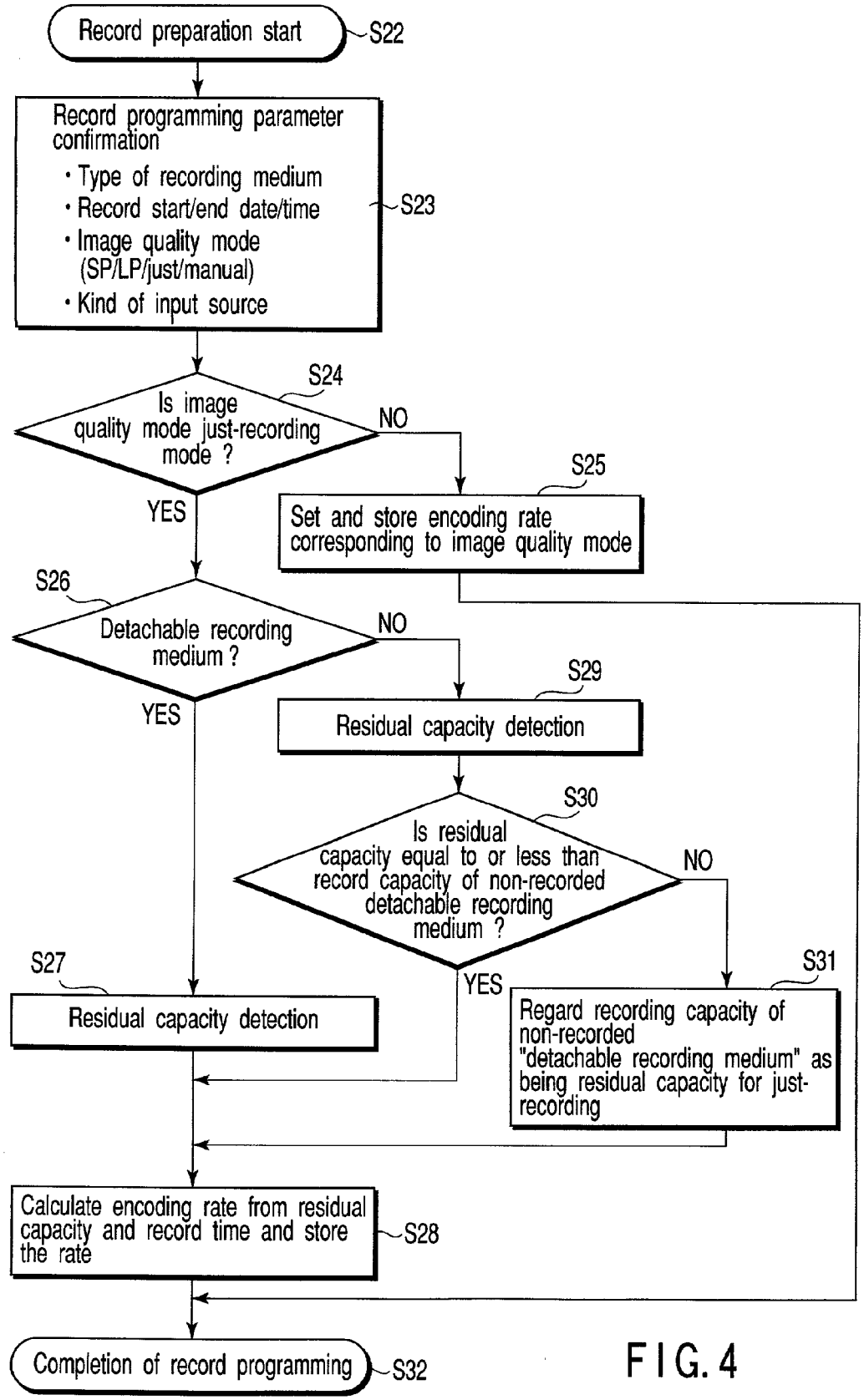
FIG. 4 is a flow chart illustrating a record preparation operation in the first embodiment.

FIG. 4 is a flow chart illustrating this record preparation operation. Specifically, when the record preparation is started (step S22), the microcomputer block 16 confirms in step S23 the record programming parameters stored in the RAM.

The microcomputer block 16 determines in step S24 whether the image quality mode is the just-recording mode. If it is determined that the image quality mode is not the just-recording mode (NO), an encoding rate corresponding to the set image quality mode is specified and stored in the RAM in step S25. The record preparation process is thus completed (step S32).

If it is determined in step S24 that the image quality mode is the just-recording mode (YES), the microcomputer block 16 determines in step S26 whether the recording medium is a detachable recording medium, that is, optical disk 11.

If it is determined in step S26 that the recording medium is the optical disk 11 (YES), the microcomputer block 16 detects a residual recording capacity of the optical disk 11 in step S27. In step S28, the microcomputer block 16 calculates an encoding rate from the residual recording capacity and record time, and stores it in the RAM. The record programming process is thus completed (step S32).

On the other hand, if it is determined in step S26 that the recording medium is not the optical disk 11 (NO), the microcomputer block 16 determines in step S29 that the recording medium for just-recording is the hard disk and detects the residual recording capacity of the hard disk.

Thereafter, the microcomputer block 16 determines in step S30 whether the residual recording capacity of the hard disk is equal to or less than the recording capacity of the optical disk 11 in the non-recorded state.

If it is determined that the residual recording capacity of the hard disk is more than the recording capacity of the non-recorded optical disk 11 (NO), the microcomputer block 16 executes in step S31 a process to regard that portion of the recording capacity of the hard disk, which is equal to the recording capacity of the non-recorded optical disk 11, as being the residual recording capacity for the just-recording. Then, the microcomputer block 16 proceeds to step S28.

In step S30, if it is determined that the residual recording capacity of the hard disk is equal to or less than the recording capacity of the non-recorded optical disk 11 (YES), the microcomputer block 16 calculates in step S28 an encoding rate from the residual recording capacity of the hard disk and record time, and stores it in the RAM. The record preparation process is thus completed (step S32).

By carrying out the record preparation operation immediately before (e.g. several seconds before) the actual start of programmed recording, the residual capacity of the hard disk can exactly be detected and the just-recording effected.

Figure 5:
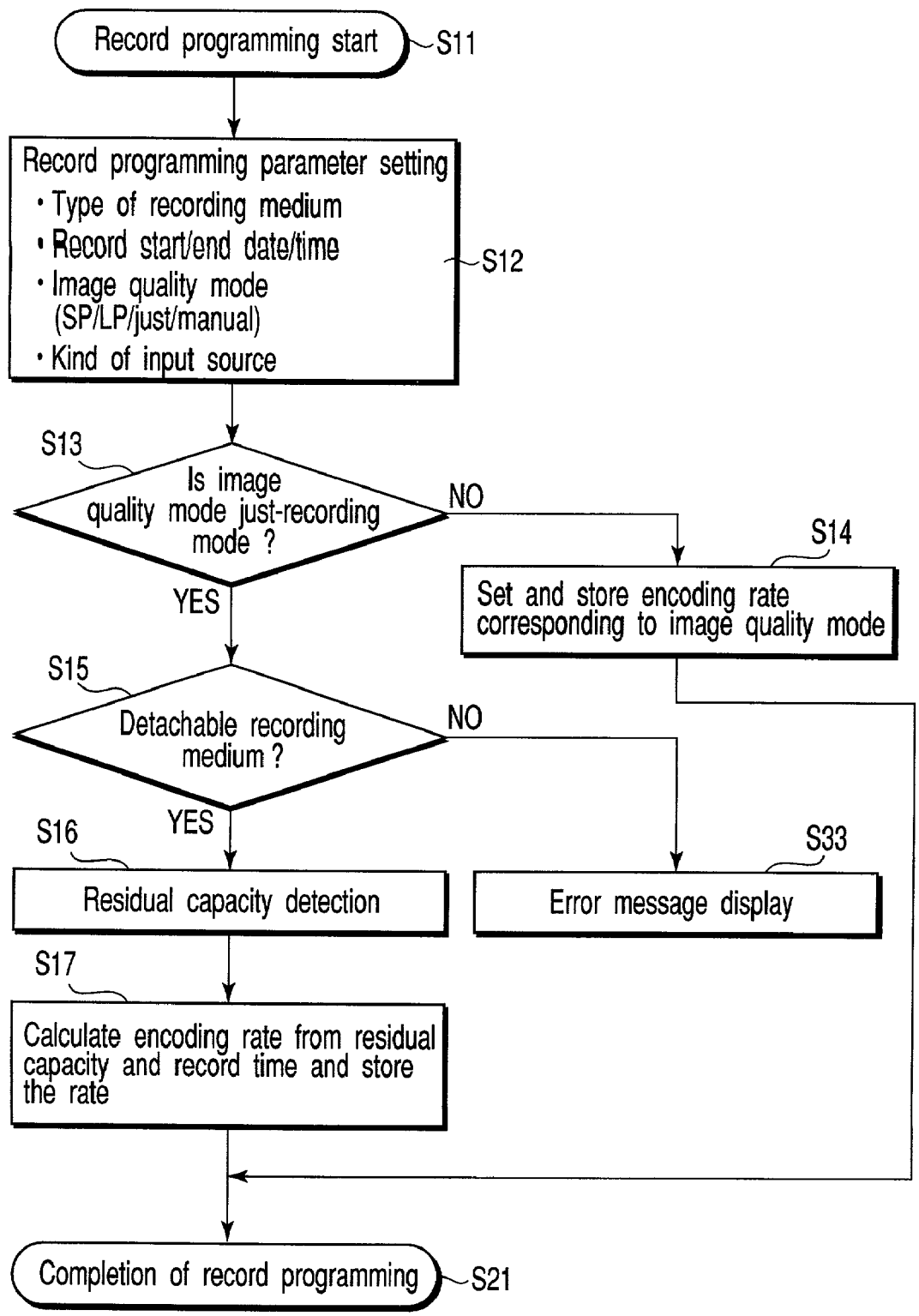
FIG. 5 is a flow chart illustrating a record programming operation in a second embodiment according to the invention.

FIG. 5 is a flow chart illustrating a record programming operation according to a second embodiment of the invention, which is performed using the image recording/reproducing apparatus shown in FIG. 1. In FIG. 5, the same steps as in FIG. 2 are denoted by like reference numerals. If it is determined in step S15 that the recording medium is not the optical disk 11 (NO), the microcomputer block 16 determines in step S33 that the recording medium for the just-recording is the hard disk, and causes the display section 23 or monitor display to display an error message to the effect that the just-recording cannot be performed.

According to the second embodiment, when the hard disk is selected as the recording medium and the just-recording mode is set, the error message is displayed to prohibit the just-recording from being effected on the hard disk.

In the prior art, such a non-practical process has been performed that image data is encoded to correspond to an enormous residual recording capacity of a hard disk, which merely increases the stream data size. According to this embodiment, this non-practical process is not performed, and the operability for users is further enhanced.

Figure 6:
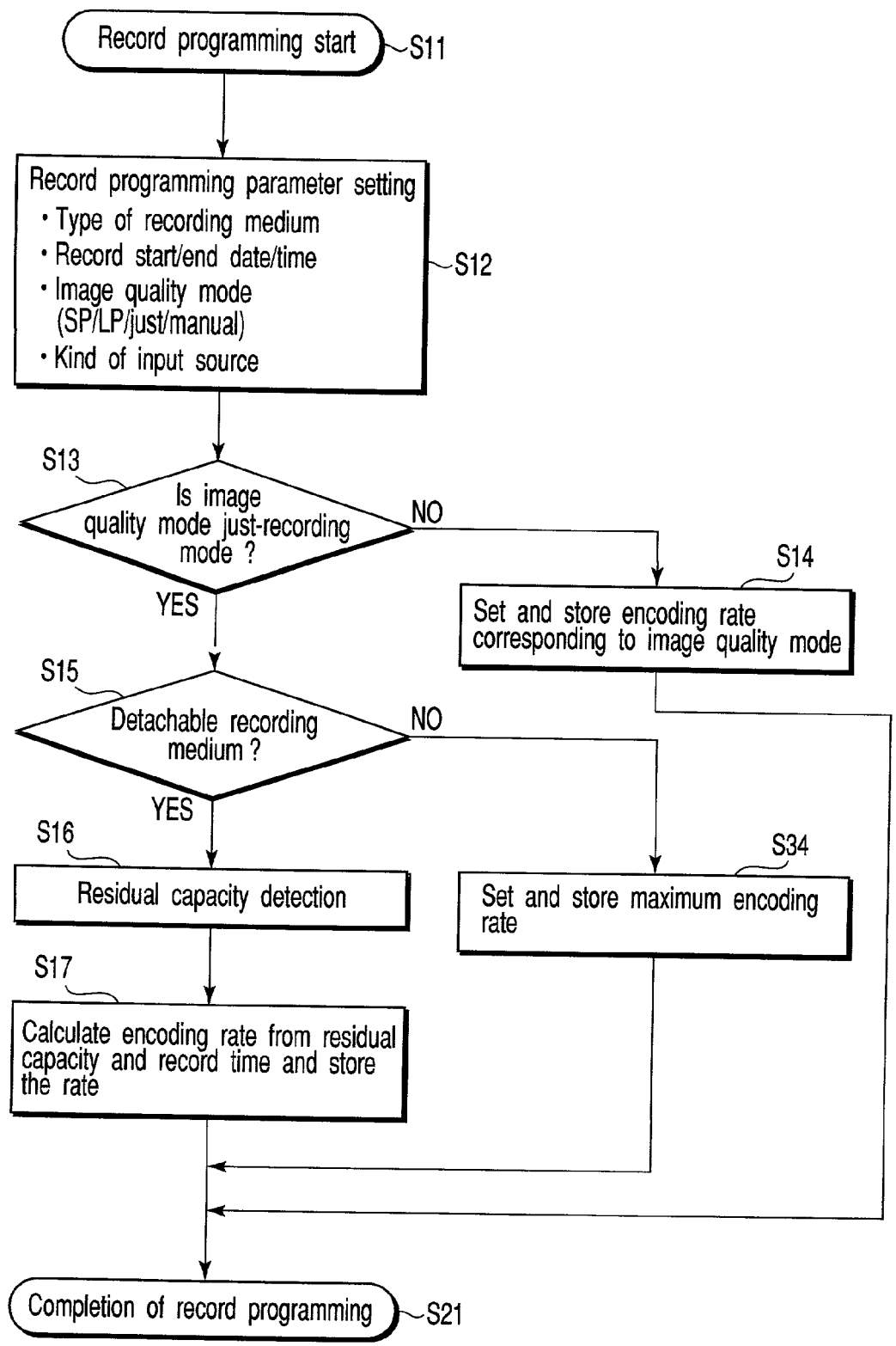
FIG. 6 is a flow chart illustrating a record programming operation in a third embodiment according to the invention.

FIG. 6 is a flow chart illustrating a record programming operation according to a third embodiment of the invention, which is performed using the image recording/reproducing apparatus shown in FIG. 1. In FIG. 6, the same steps as in FIG. 2 are denoted by like reference numerals. If it is determined in step S15 that the recording medium is not the optical disk 11 (NO), the microcomputer block 16 determines in step S34 that the recording medium for the just-recording is the hard disk, and forcibly sets a maximum encoding rate and stores it in the RAM. The microcomputer block 16 then finishes the record programming process (step S21).

According to the third embodiment, when the hard disk is selected as the recording medium and the just-recording mode is set, the encoding rate for compression-encoding to-be-recorded data is forcibly set at a maximum encoding rate. Thus, recording with an optimal image quality, although not just-recording, can be effected on the hard disk.

Figure 7:
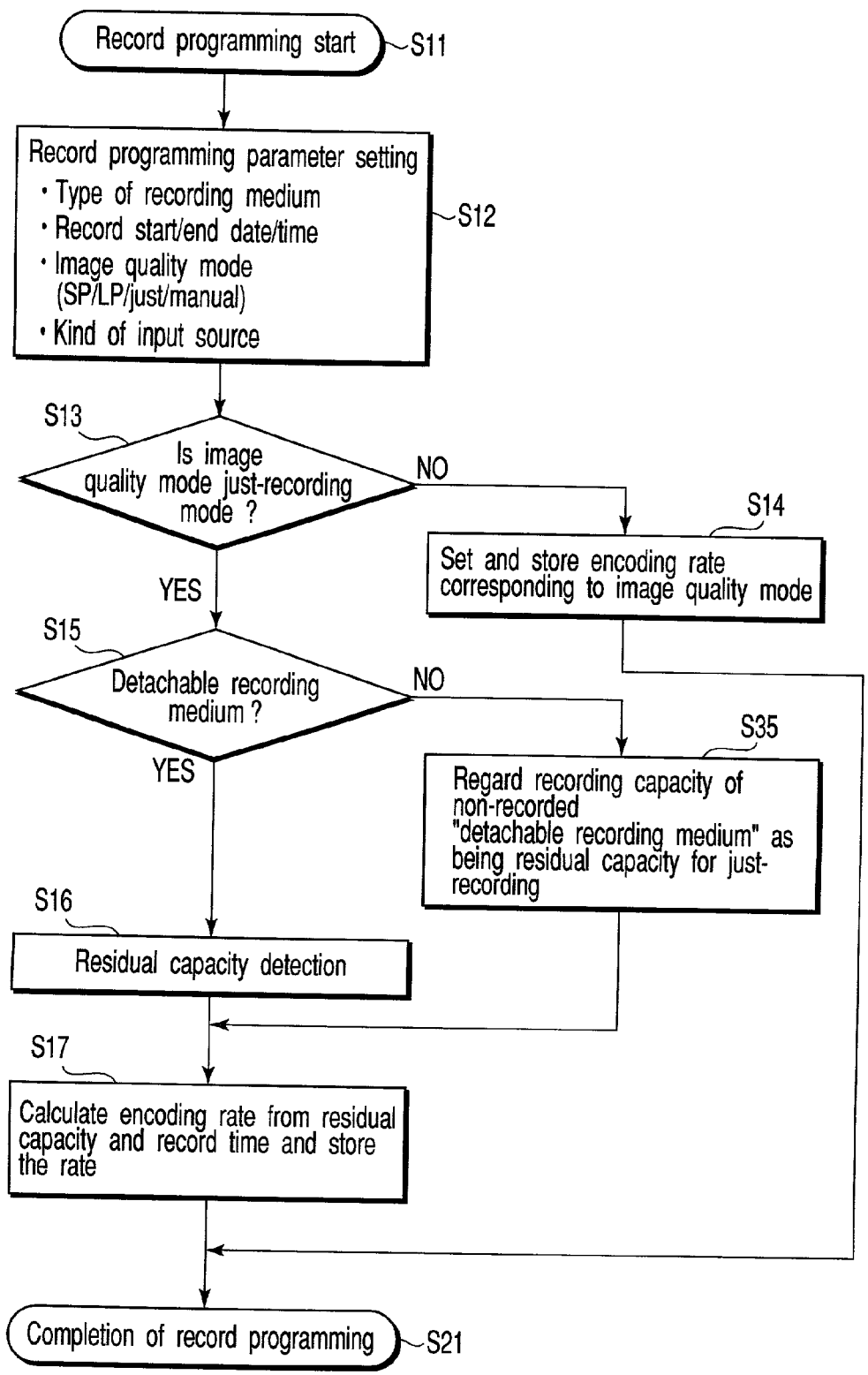
FIG. 7 is a flow chart illustrating a record programming operation in a fourth embodiment according to the invention.

FIG. 7 is a flow chart illustrating a record programming operation according to a fourth embodiment of the invention, which is performed using the image recording/reproducing apparatus shown in FIG. 1. In FIG. 7, the same steps as in FIG. 2 are denoted by like reference numerals. If it is determined in step S15 that the recording medium is not the optical disk 11 (NO), the microcomputer block 16 determines in step S35 that the recording medium for the just-recording is the hard disk, and executes a process to regard that portion of the recording capacity of the hard disk, which is equal to the recording capacity of the non-recorded optical disk 11, as being the residual recording capacity for the just-recording. Then, the microcomputer block 16 proceeds to step S17.

Specifically, the encoding rate for compression-encoding to-be-recorded data is set such that just-recording may be effected on that portion of the recording capacity of the hard disk, which is equal to the recording capacity of the non-recorded optical disk 11.

According to the fourth embodiment, when the hard disk is selected as the recording medium and the just-recording mode is set, the just-recording is effected on that portion of the recording capacity of the hard disk, which is equal to the recording capacity of the non-recorded optical disk 11. Thus, the data recorded on the hard disk can advantageously be transferred to the optical disk 11.

Figure 8:
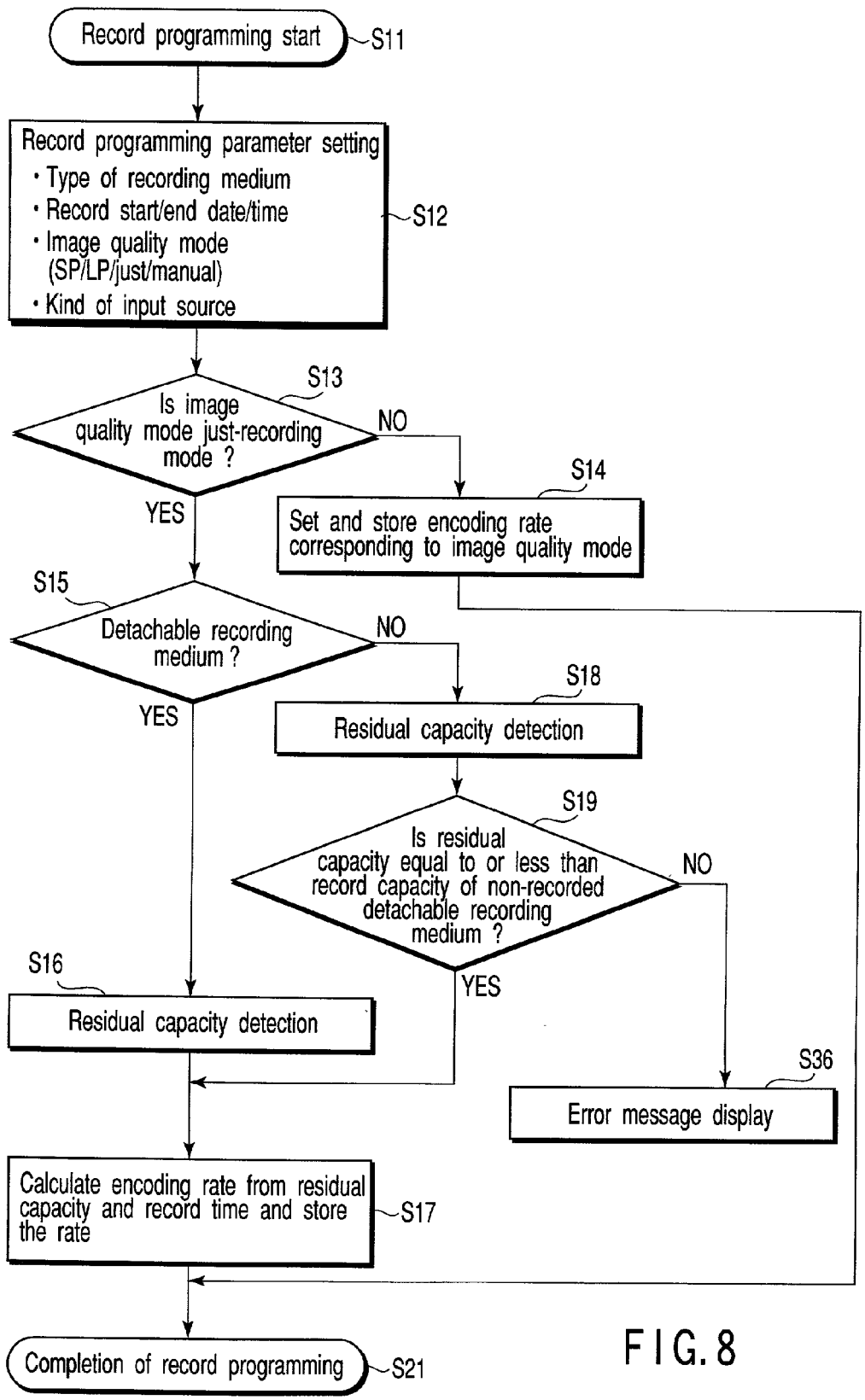
FIG. 8 is a flow chart illustrating a record programming operation in a fifth embodiment according to the invention.

FIG. 8 is a flow chart illustrating a record programming operation according to a fifth embodiment of the invention, which is performed using the image recording/reproducing apparatus shown in FIG. 1. In FIG. 8, the same steps as in FIG. 2 are denoted by like reference numerals. If it is determined in step S19 that the residual recording capacity of the hard disk is more than the recording capacity of the non-recorded optical disk 11 (NO), the microcomputer block 16 causes, in step S36, the display section 23 or monitor display to display an error message to the effect that the just-recording cannot be performed.

According to the fifth embodiment, even where the hard disk is selected as the recording medium and the just-recording mode is set, if the residual recording capacity of the hard disk is equal to or less than the recording capacity of the non-recorded optical disk 11, the just-recording is effected. Thus, the just-recording can be effected on the hard disk without the problem in the prior art.

Figure 9:
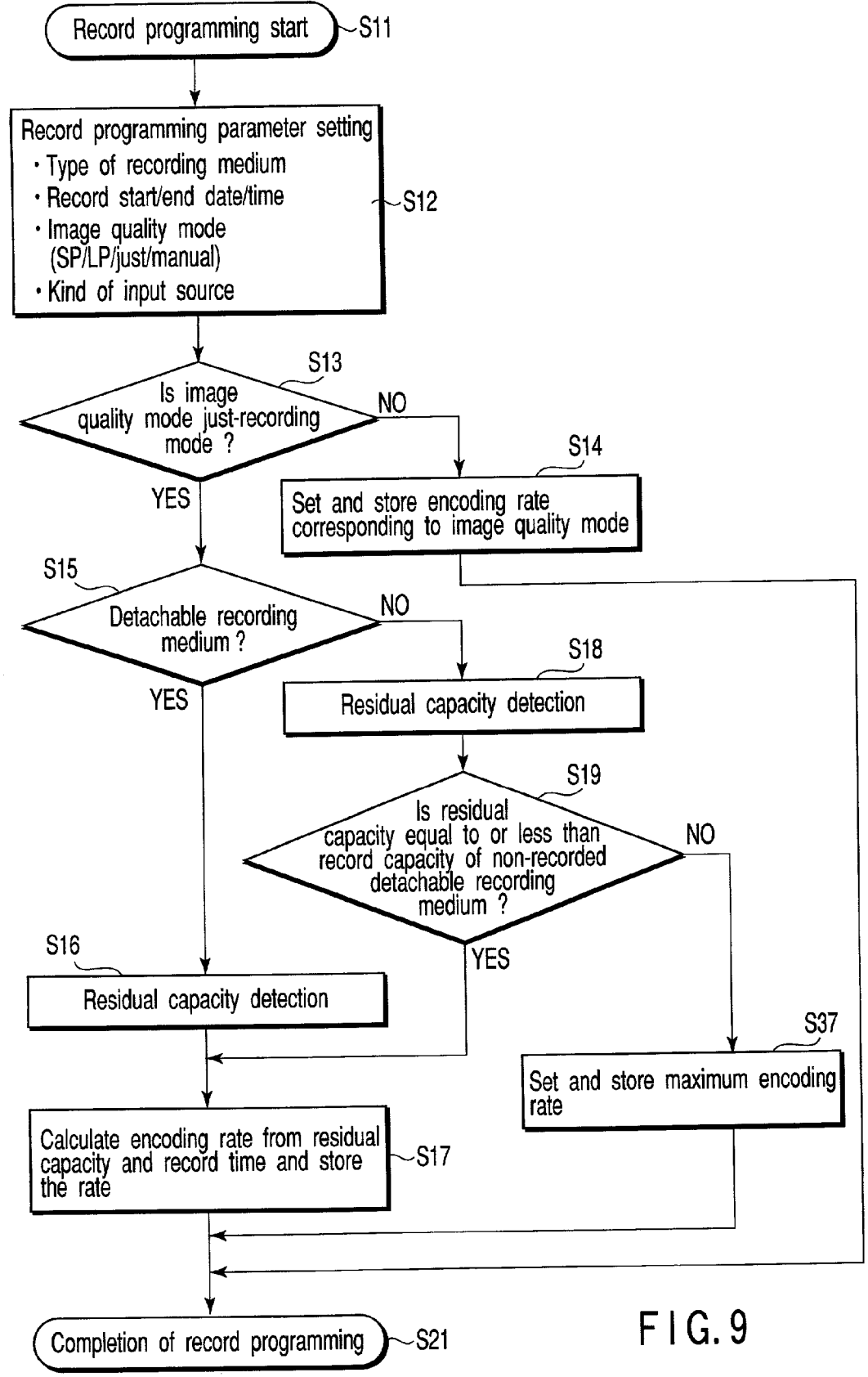
FIG. 9 is a flow chart illustrating a record programming operation in a sixth embodiment according to the invention.

FIG. 9 is a flow chart illustrating a record programming operation according to a sixth embodiment of the invention, which is performed using the image recording/reproducing apparatus shown in FIG. 1. In FIG. 9, the same steps as in FIG. 2 are denoted by like reference numerals. If it is determined in step S19 that the residual recording capacity of the hard disk is more than the recording capacity of the non-recorded optical disk 11 (NO), the microcomputer block 16, in step S37, forcibly sets a maximum encoding rate and stores it in the RAM. The microcomputer block 16 then finishes the record programming process (step S21).

According to the sixth embodiment, even where the hard disk is selected as the recording medium and the just-recording mode is set, if the residual recording capacity of the hard disk is equal to or less than the recording capacity of the non-recorded optical disk 11, the just-recording is effected. Thus, the just-recording can be effected on the hard disk without the problem in the prior art.

In the above-described embodiments, the recording capacity of the entire hard disk is considered and a residual recording capacity in the hard disk is detected. Alternatively, the entirety of the recording capacity of the hard disk may be divided into a plurality of regions, and only one of the divided regions may be considered and a residual recording capacity of the one region may be detected.

As has been described above in detail, the present invention provides an image recording/reproducing apparatus capable of handling at the same time a recording medium detachably attached to the apparatus and a large-capacity recording medium built in the apparatus. According to this apparatus, disadvantages of the large-capacity recording medium at the time of using a just-recording function can be eliminated, and the operability for users can further be enhanced. For example, the present invention is advantageously applicable to an image recording/reproducing apparatus capable of simultaneously handling a rewritable optical disk and a hard disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recording/reproducing apparatus capable of effecting recording/reproducing of compression-encoded image information for a first recording medium detachably attached to the apparatus and a second recording medium built in the apparatus and having a larger capacity than the first recording medium, wherein in a state in which recording needs to be effected on the second recording medium, with a compression encoding rate for the image information being controlled to use an entirety of a residual recording capacity of the second recording medium, it is determined whether the residual recording capacity of the second recording medium is equal to or smaller than a residual recording capacity of the first recording medium that is in a non-recorded state, and if the residual recording capacity of the second recording medium is equal to or smaller than the residual recording capacity of the first recording medium in the non-recorded state, the compression encoding rate for the image information is set to use the entirety of the residual recording capacity of the second recording medium, and if the residual recording capacity of the second recording medium is larger than the residual recording capacity of the first recording medium in the non-recorded state, the compression encoding rate for the image information is set by regarding the residual recording capacity of the second recording medium as equal to the residual recording capacity of the first recording medium in the non-recorded state.

2. An image recording/reproducing apparatus according to claim 1, wherein a recording region of the second recording medium is divided into a plurality of regions, and a residual recording capacity of each of the recording regions is individually determined.

3. An image recording/reproducing apparatus capable of effecting recording/reproducing of compression-encoded image information for a first recording medium detachably attached to the apparatus and a second recording medium built in the apparatus and having a larger capacity than the first recording medium,
wherein in a state in which recording needs to be effected on the second recording medium, with a compression encoding rate for the image information being controlled to use an entirety of a residual recording capacity of the second recording medium, it is determined whether the residual capacity of the second recording medium is equal to or smaller than a residual recording capacity of the first recording medium that is a non-recorded state, and if the residual recording capacity of the second recording medium is equal to or smaller than the residual recording capacity of the first recording medium in the non-recorded state, the compression encoding rate for the image information is set to use the entirety of the residual recording capacity of the second recording medium, and if the residual recording capacity of the second recording medium is larger than the residual recording capacity of the first recording medium in the non-recorded state an error message is displayed.

4. An image recording/reproducing apparatus capable of effecting recording/reproducing of compression-encoded image information for a first recording medium detachably attached to the apparatus and a second recording medium built in the apparatus and having a larger capacity than the first recording medium,
wherein in a state in which recording needs to be effected on the second recording medium, with a compression encoding rate for the image information being controlled to use an entirety of a residual recording capacity of the second recording medium, it is determined whether the residual capacity of the second recording medium is equal to or smaller than a residual recording capacity of the first recording medium that is a non-recorded state, and if the residual recording capacity of the second recording medium is equal to or smaller than the residual recording capacity of the first recording medium in the non-recorded state, the compression encoding rate for the image information is set to use the entirety of the residual recording capacity of the second recording medium, and if the residual recording capacity of the second recording medium is larger than the residual recording capacity of the first recording medium in the non-recorded state, the compression encoding rate for the image information is set at a maximum compression recording rate.

5. An image recording/reproducing method capable of effecting recording/reproducing of compression-encoded image information for a first recording medium detachably attached to the apparatus and a second recording medium built in the apparatus and having a larger capacity than the first recording medium, the method comprising: in a state in which recording needs to be effected on the second recording medium, with a compression encoding rate for the image information being controlled to use an entirety of a residual recording capacity of the second recording medium, determining whether the residual recording capacity of the second recording medium is equal to or smaller than a residual recording capacity of the first recording medium that is in a non-recorded state, and if the residual recording capacity of the second recording medium is equal to or smaller than the residual recording capacity of the first recording medium in the non-recorded state, setting the compression encoding rate for the image information is set to use the entirety of the residual recording capacity of the second recording medium, and if the residual recording capacity of the second recording medium is larger than the residual recording capacity of the first recording medium in the non-recorded state, setting the compression encoding rate for the image information by regarding the residual recording capacity of the second recording medium being equal to the residual recording capacity of the first recording medium in the non-record state.

6. An image recording/reproducing method according to claim 5, wherein a recording region of the second recording medium is divided into a plurality of regions, and a residual recording capacity of each of the recording regions is individually determined.

7. An image recording/reproducing method capable of effecting recording/reproducing of compression-encoded image information for a first recording medium detachably attached to the apparatus and a second recording medium built in the apparatus and having a larger capacity than the first recording medium,
the method comprising: in a state in which recording needs to be effected on the second recording medium, with a compression encoding rate for the image information being controlled to use an entirety of a residual recording capacity of the second recording medium, it is determined whether the residual recording capacity of the second recording medium is equal to or smaller than a residual recording capacity of the first recording medium, determining whether the residual recording capacity of the second recording medium is equal to or smaller than the residual recording capacity of the first recording medium in the non-recorded state, setting the compression encoding rate for the image information to use the entirety of the residual recording capacity of the second recording medium, and if the residual recording capacity of the second recording medium is larger than the residual recording capacity of the first recording medium in the non-recorded state, displaying an error message.

8. An image recording/reproducing method capable of effecting recording/reproducing of compression-encoded image information for a first recording medium detachably attached to an apparatus and a second recording medium built in the apparatus and having a larger capacity than the first recording medium, the method comprising: in a state in which recording needs to be effected on the second recording medium, with a compression encoding rate for the image information being controlled to use an entirety of a residual recording capacity of the second recording medium, it is determined whether the residual recording capacity of the second recording medium is equal to or smaller than a residual recording capacity of the first recording medium that is in a non-recorded state, and if the residual recording capacity of the second recording medium is equal to or smaller than the residual recording capacity of the first recording medium in the non-recorded state, setting the compression encoding rate for the image information to use the entirety of the residual recording capacity of the second recording medium, and if the residual recording capacity of the second recording medium is larger than the residual recording capacity of the first recording medium in the non-recorded state, setting the compression encoding rate for the image information at a maximum compression recording rate.

* * * * *